United States Patent [19]

Tsutsumida et al.

[11] Patent Number: 5,547,173

[45] Date of Patent: Aug. 20, 1996

[54] FLUID-FILLED CYLINDRICAL ELASTIC MOUNT HAVING THREE FLUID CHAMBERS AND THREE ORIFICES, WITH ONE VALVE MEANS PROVIDED IN ONE ORIFICE

[75] Inventors: Joji Tsutsumida, Komaki; Yasuhiro Suzuki, Chigasaki; Tetsuo Uozumi, Zama, all of Japan

[73] Assignees: Tokai Rubber Industries, Ltd.; Nissan Motor Company, Ltd., both of Japan

[21] Appl. No.: 506,591

[22] Filed: Jul. 25, 1995

[30] Foreign Application Priority Data

Jul. 28, 1994 [JP] Japan .................................. 6-176890

[51] Int. Cl.⁶ .................................................. F16F 13/00
[52] U.S. Cl. ...................................................... 267/140.15
[58] Field of Search ...................... 267/140.12, 140.15, 267/141, 141.2, 219, 35, 292, 293; 248/562, 636, 638; 180/300, 312, 902; 188/299

[56] References Cited

U.S. PATENT DOCUMENTS

| | | | |
|---|---|---|---|
| 5,246,213 | 9/1993 | Zup et al. | 267/140.14 |
| 5,267,726 | 12/1993 | Takeo et al. | 267/140.14 |
| 5,310,169 | 5/1994 | Kojima | 267/140.14 |
| 5,375,822 | 12/1994 | Hirasawa et al. | 267/140.15 |

FOREIGN PATENT DOCUMENTS

| | | |
|---|---|---|
| 6-50379 | 2/1994 | Japan . |
| 6-74287 | 10/1994 | Japan . |
| 7-190134 | 7/1995 | Japan . |

*Primary Examiner*—Josie Ballato
*Attorney, Agent, or Firm*—Parkhurst, Wendel & Burr, L.L.P.

[57] ABSTRACT

A fluid-filled cylindrical elastic mount having an inner sleeve and an outer sleeve, and an elastic body interposed therebetween. The elastic mount also has a primary fluid chamber adapted to undergo pressure changes upon application of a vibrational load to the mount, and a first and a second auxiliary fluid chamber partially defined by a first and a second flexible diaphragm, respectively. The second flexible diaphragm has a greater stiffness than the first flexible diaphragm. A non-compressible fluid flows between the primary and first auxiliary fluid chambers, through a first orifice passage tuned to a first frequency range, and a second orifice passage tuned to a second frequency range that is higher than the first frequency range. The fluid also flows between the primary and second auxiliary fluid chambers, through a third orifice passage tuned to a third frequency range that is higher than the second frequency range. The elastic mount further includes a valve for selectively permitting or interrupting flow of the fluid through the second orifice passage between the primary fluid chamber and the first auxiliary fluid chamber.

7 Claims, 6 Drawing Sheets

FLUID-FILLED CYLINDRICAL ELASTIC MOUNT HAVING THREE FLUID CHAMBERS AND THREE ORIFICES, WITH ONE VALVE MEANS PROVIDED IN ONE ORIFICE

BACKGROUND OF THE INVENTION

1. Field of the Invention

The present invention relates in general to a fluid-filled cylindrical elastic mount which provides a desired vibration damping or isolating effect, utilizing flow of a fluid contained therein, and more particularly to such a cylindrical elastic mount that has three orifice passages tuned to different frequency ranges, and exhibits different vibration damping or isolating characteristics depending upon a frequency range of input vibrations, by forcing the fluid to flow through a selected one of the orifice passages.

2. Discussion of Related Art

A cylindrical elastic mount is known as a vibration damper interposed between two members of a vibration system, to flexibly connecting the two members or flexibly mounting one of the two members on the other member. The cylindrical elastic mount includes an inner sleeve fixed to one of the two members, an outer sleeve fixed to the other member and disposed coaxially or eccentrically with respect to the inner sleeve with a suitable radial spacing therebetween, and an elastic body interposed between the two sleeves for elastically connecting these sleeves. The elastic mount also has a primary fluid chamber which is partially defined by the elastic body and is adapted to undergo pressure changes upon application of vibrations to the mount, an auxiliary fluid chamber which is partially defined by a flexible diaphragm and is adapted to permit volumetric changes thereof, and an orifice passage connecting these primary and auxiliary chambers to each other. The cylindrical elastic mount as described above utilizes an effect of flow of the fluid, more specifically, the resonance of the fluid flowing through the orifice passage, so as to provide such a high vibration damping or isolating effect that is not achieved only by the elasticity of the elastic body. This type of elastic mount has been favorably used as an engine mount for a motor vehicle, for example.

Generally, the elastic mount, such as an engine mount, receives different kinds of vibrations having different frequencies and amplitudes, and is required to exhibit different vibration damping and isolating characteristics with respect to those vibrations. However, the damping or isolating of the input vibrations based on the resonance of the fluid flowing through the orifice passage is effective only to a relatively narrow frequency range to which the orifice passage is tuned. Thus, the known elastic mount having only one orifice passage is hard to achieve desired vibration damping and isolating characteristics. JP-A-6-74287 (published in 1994) discloses a fluid-filled cylindrical elastic mount having a primary fluid chamber and an auxiliary fluid chamber between which a first orifice passage and a second orifice passage tuned to different frequency ranges are formed in parallel with each other. This elastic mount further includes a rotary valve for selectively permitting or interrupting flow of the fluid through the second orifice passage tuned to the higher frequency range. In this arrangement, the cylindrical elastic mount selectively provides a high damping effect with respect to low-frequency vibrations due to the fluid flow through the first orifice passage, and a high isolating effect with respect to high-frequency vibrations due to the fluid flow through the second orifice passage, depending upon the input vibrations, for example. While this elastic mount is capable of damping or isolating the input vibrations in two different frequency ranges, due to the flow of the fluid through the two orifice passages, the elastic mount used in a motor vehicle, in particular, is strongly desired to exhibit three different vibration damping and isolating effects for input vibrations in three different frequency ranges. That is, the vehicle elastic mount is required to provide a high damping effect with respect to low-frequency vibrations of around 10 Hz, such as engine shake, a high isolating effect with respect to medium-frequency vibrations of about 15–40 Hz, such as those occurring during idling of the engine, and a high isolating effect with respect to high-frequency vibrations of about 60–80 Hz, such as booming noise during a low-speed running of a motor vehicle.

JP-A-6-50379 (published in 1994) discloses a cylindrical elastic mount having a primary fluid chamber, a first auxiliary fluid chamber, a second auxiliary fluid chamber, a first orifice passage tuned to a low frequency range, a second orifice passage tuned to a medium frequency range and a third orifice passage tuned to a high frequency range. The first and second orifice passages are formed between the primary fluid chamber and the first auxiliary fluid chamber, while the third orifice passage is formed between the primary fluid chamber and the second auxiliary fluid chamber. The second auxiliary fluid chamber is defined by a wall having a larger stiffness (or resistance to deformation) than a wall defining the first auxiliary fluid chamber. Upon application of the low-frequency vibrations to which the first orifice passage is tuned, therefore, the fluid is more likely to flow through the first orifice passage than the third orifice passage. Further, valve means is provided for permitting a selected one of the second and third orifice passages to communicate with the corresponding two fluid chambers. Thus, the present elastic mount exhibits different damping and isolating characteristics depending upon the input vibrations, so as to damp or isolate the low-, medium-, and high-frequency vibrations due to flow of the fluid through the first, second and third orifice passages.

In the cylindrical elastic mount as disclosed in JP-A-6-50379 indicated above, however, only one of the second and third orifice passages is selected to communicate with the corresponding fluid chambers. It is therefore considerably difficult for the elastic mount to effectively isolate the medium-frequency vibrations and the high-frequency vibrations at the same time. When the elastic mount receives the high-frequency vibrations with the second orifice passage communicating with the primary chamber and the first auxiliary fluid chamber, in particular, the flow resistance of the second orifice passage becomes excessively high, owing to the high-frequency input vibrations, whereby the isolating effect for the high-frequency vibrations is considerably deteriorated.

In the cylindrical elastic mount as described above, the valve means for selectively permitting the fluid communication of the second and third orifice passages may consist of two switching valves provided in the the second and third orifice passages, respectively, or a single valve having two valve faces which are open to the respective second and third orifice passages. The use of the two valves may result in an increased number of components and complicated structure of the elastic mount, and reduced efficiency in manufacturing the mount. On the other hand, the use of the single valve having the two valve faces may add a limit to a choice of design for the orifice passages, making it difficult to suitably determine the shapes and dimensions of the orifice passages, so as to ensure desired cross sectional areas and lengths of the passages.

Further, in the above cylindrical elastic mount, the wall defining the second auxiliary fluid chamber includes a flexible diaphragm which is formed by closing a window of the outer sleeve with a part of a rubber layer bonded by vulcanization to the inner circumferential surface of the outer sleeve. The flexible diaphragm may otherwise be a separate rubber film-like member provided on the inner circumferential surface of the outer sleeve to expand into the second auxiliary fluid chamber. However, it is considerably difficult to produce the mount having such a flexible diaphragm, and the flexible diaphragm thus formed is likely to be damaged, since it is exposed to the outside of the mount through the window of the outer sleeve.

SUMMARY OF THE INVENTION

It is therefore an object of the invention to provide a fluid-filled cylindrical elastic mount having a first, a second and a third orifice passage tuned to different frequency ranges, i.e., low-, medium-, and high-frequency ranges, which elastic mount selectively provides a damping effect with respect to low-frequency vibrations due to flow of a fluid through the first orifice passage, and an isolating effect with respect to medium-frequency vibrations due to fluid flow through the second orifice passage, while, in each case, assuring a high isolating effect with respect to high-frequency vibrations due to fluid flow through the third orifice passage.

It is another object of the invention to provide a fluid-filled cylindrical elastic mount which exhibits different vibration damping/isolating characteristics by selectively opening and closing only one of the orifice passages by means of a single valve. The use of the single valve only requires a simplified orifice-defining structure, and increases a choice of design of the orifice passages.

The above objects may be accomplished according to the principle of the present invention, which provides a fluid-filled cylindrical elastic mount for flexibly connecting two members to each other, comprising: (a) an inner sleeve fixed to one of the two members to be flexible connected; (b) an outer sleeve disposed radially outwardly of the inner sleeve with a radial spacing therebetween, and fixed to the other of the two members; (c) an elastic body interposed between the inner and outer sleeves, the elastic body partially defining a primary fluid chamber formed between the inner and outer sleeves, the primary fluid chamber being adapted to undergo pressure changes upon application of a vibrational load to the mount; (d) a first flexible diaphragm partially defining a first auxiliary fluid chamber formed between the inner and outer sleeves, a volume of the first auxiliary fluid chamber being variable due to deformation of the first flexible diaphragm; (e) a second flexible diaphragm partially defining a second auxiliary fluid chamber formed between the inner and outer sleeves, a volume of the second auxiliary fluid chamber being variable due to deformation of the second flexible diaphragm, the second flexible diaphragm having a larger stiffness than the first flexible diaphragm; (f) a non-compressible fluid filling the primary fluid chamber, the first auxiliary fluid chamber and the second auxiliary fluid chamber; (g) an orifice-defining structure for separately defining a first orifice passage, a second orifice passage, and a third orifice passage, the first orifice passage communicating with the primary fluid chamber and the first auxiliary fluid chamber so as to allow the non-compressible fluid to flow therebetween, the first orifice passage being tuned to a first frequency range, the second orifice passage communicating with the primary fluid chamber and the first auxiliary fluid chamber so as to allow the non-compressible fluid to flow therebetween, the second orifice passage being tuned to a second frequency range that is higher than the first frequency range, the third orifice passage communicating with the primary fluid chamber and the second auxiliary fluid chamber so as to allow the non-compressible fluid to flow therebetween, the third orifice passage being tuned to a third frequency range that is higher than the second frequency range, and being designed such that the non-compressible fluid is less likely to flow through the third orifice passage than through the first and second orifice passages, when the mount receives vibrations in the first and second frequency ranges; and (h) valve means for selectively permitting or interrupting flow of the fluid through the second orifice passage between the primary fluid chamber and the second auxiliary fluid chamber.

In the cylindrical fluid-filled elastic mount constructed as described above, the fluid flow through the second orifice passage is selectively permitted or inhibited by the valve means, so that the mount exhibits different vibration damping/isolating characteristics depending upon the input vibrations. With the second orifice passage shut off or disconnected by the valve, the elastic mount is able to effectively damp low-frequency vibrations due to flow of the fluid through the first orifice passage, and also effectively isolate high-frequency vibrations due to flow of the fluid through the third orifice passage. With the second orifice passage communicating with the primary and first auxiliary fluid chambers, on the other hand, the elastic mount is able to effectively isolate medium-frequency vibrations due to flow of the fluid through the second orifice passage, and also effectively isolate high-frequency vibrations due to the fluid flow through the third orifice passage. Thus, the present elastic mount exhibits excellent vibration damping/isolating characteristics with respect to a wide frequency range of input vibrations.

In the fluid-filled elastic mount as described above, only the second orifice passage is selectively placed in its open position and closed position by the valve means, while the first and third orifice passages are always held in fluid communication with the corresponding two fluid chambers. This eliminates a need to provide a plurality of valves in two or more orifice passages, and also reduces or eliminates a limit to a choice of design of the orifice passages, which limit might result from the position of two or more valves provided in a conventional elastic mount. Thus, the elastic mount according to the present invention has a simplified structure, and effectively and easily achieves desired vibration damping and isolating characteristics.

In one preferred form of the present invention, the cylindrical elastic mount further includes an intermediate sleeve disposed radially outwardly of the inner sleeve with a radial spacing therebetween, and having a first window, a second window, and a third window. In this case, the elastic body is interposed between and bonded by vulcanization to the inner sleeve and the intermediate sleeve, and has a first pocket, a second pocket and a third pocket, which are open on an outer circumferential surface of the intermediate sleeve through the first window, the second window and the third window, respectively. The primary fluid chamber, the first auxiliary fluid chamber and the second auxiliary fluid chamber are formed by closing respective openings of the first and second and third pockets with the outer sleeve, and the first flexible diaphragm provides a bottom wall of the second pocket while the second flexible diaphragm provides a bottom wall of the third pocket.

In the above form of the invention, the primary fluid chamber and the first and second auxiliary fluid chambers can be easily formed by closing the openings of the first, second and third pockets with the outer sleeve. Further, the first and second flexible diaphragms which provide the bottom walls of the second and third pockets are not exposed to the outside of the elastic mount, and are thus prevented from being damaged.

In another preferred form of the invention, the first and second flexible diaphragms are formed as integral parts of the elastic body. This advantageously reduces the number of components required to produce the mount, and simplifies the mount structure, thus assuring improved efficiency in manufacturing the elastic mount.

In a further preferred form of the invention, the first auxiliary fluid chamber and the second auxiliary fluid chamber are located diametrically opposite to the primary fluid chamber with respect to the inner sleeve, in a direction in which the vibrational load is mainly applied to the mount. In this case, the first and second auxiliary fluid chambers are spaced a suitable distance from each other in a circumferential direction of the mount. This arrangement ensures a sufficiently large space or room for forming the primary chamber and the first and second auxiliary fluid chambers.

In a still further preferred form of the invention, the first, second and third orifice passages are defined by an annular or cylindrical orifice-defining structure disposed along an inner circumferential surface of the outer sleeve, such that the first orifice passage extends in a circumferential direction of the mount over a length of at least one round of the mount, and the second orifice passage extends from the primary fluid chamber in one of opposite circumferential directions, over a length of less than one round of the mount, while the third orifice passage extends from the primary fluid chamber in the other circumferential direction, over a length of less than one round of the mount. The use of the cylindrical orifice-defining structure facilitates formation of the first, second and third orifice passages. Further, the second and third orifice passages which extend from the primary fluid chamber in the opposite circumferential directions can be formed with high efficiency within a limited space of the mount.

The orifice-defining structure indicated above may have a tunnel formed therethrough so as to provide a circumferential portion of the second orifice passage, and further have a valve mounting hole which communicates with the tunnel and is open on an outer circumferential surface thereof. The above-indicated valve means consists of a rotary valve which is received in the valve mounting hole.

In another preferred form of the invention, the ratio of the cross sectional area of the third orifice passage to the length thereof is smaller than the ratio of the cross sectional area of the second orifice passage to the length thereof. In this case, a sufficiently large amount of the fluid is caused to flow through the second orifice passage when the mount receives vibrations in the second frequency range to which the second orifice passage is tuned, and the elastic mount exhibits a high vibration isolating effect due to the resonance of the fluid flowing through the second orifice passage.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
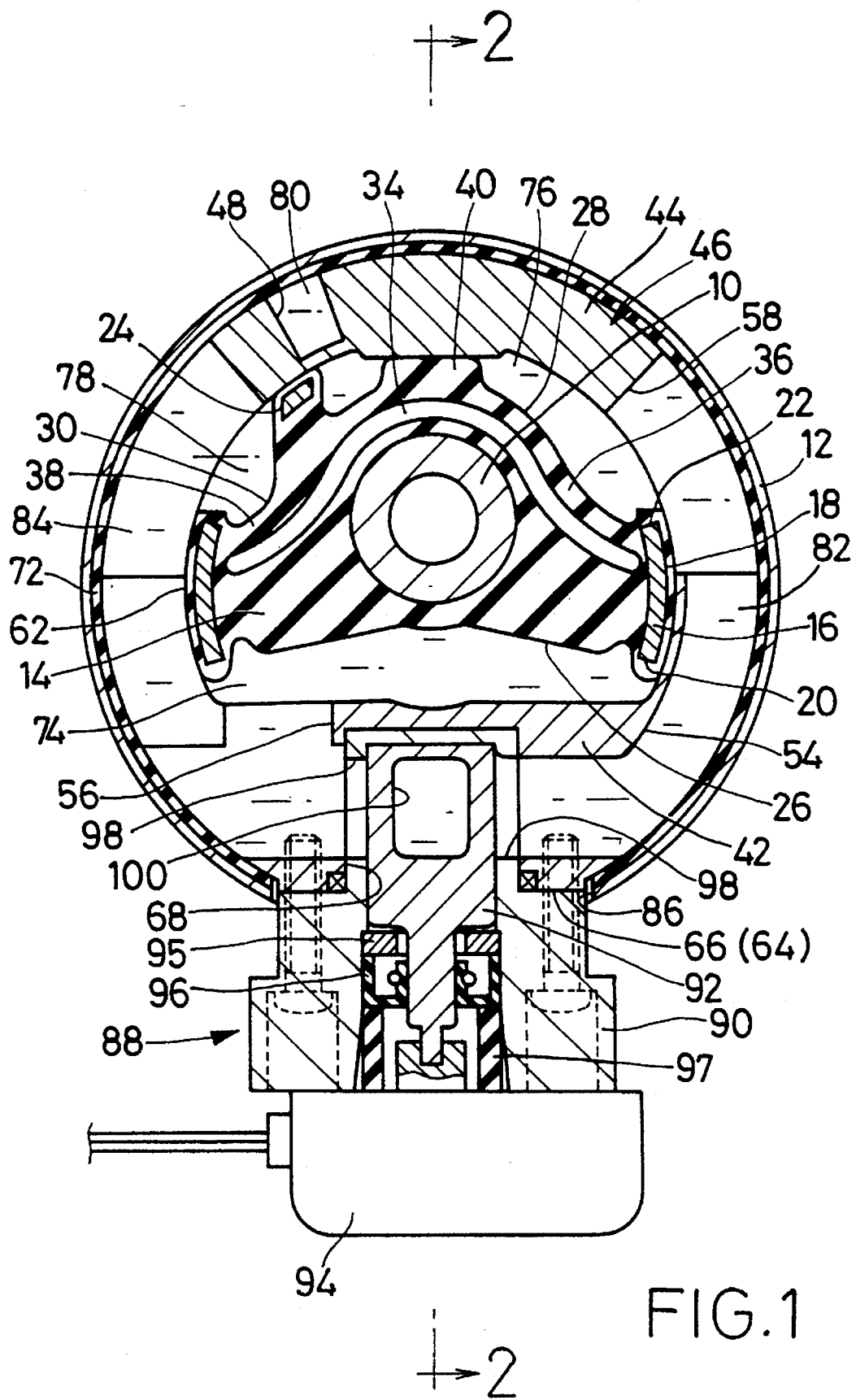
FIG. 1 is an elevational view in transverse cross section of one embodiment of a fluid-filled cylindrical elastic mount of the present invention in the form of an engine mount for a motor vehicle.
Figure 2:
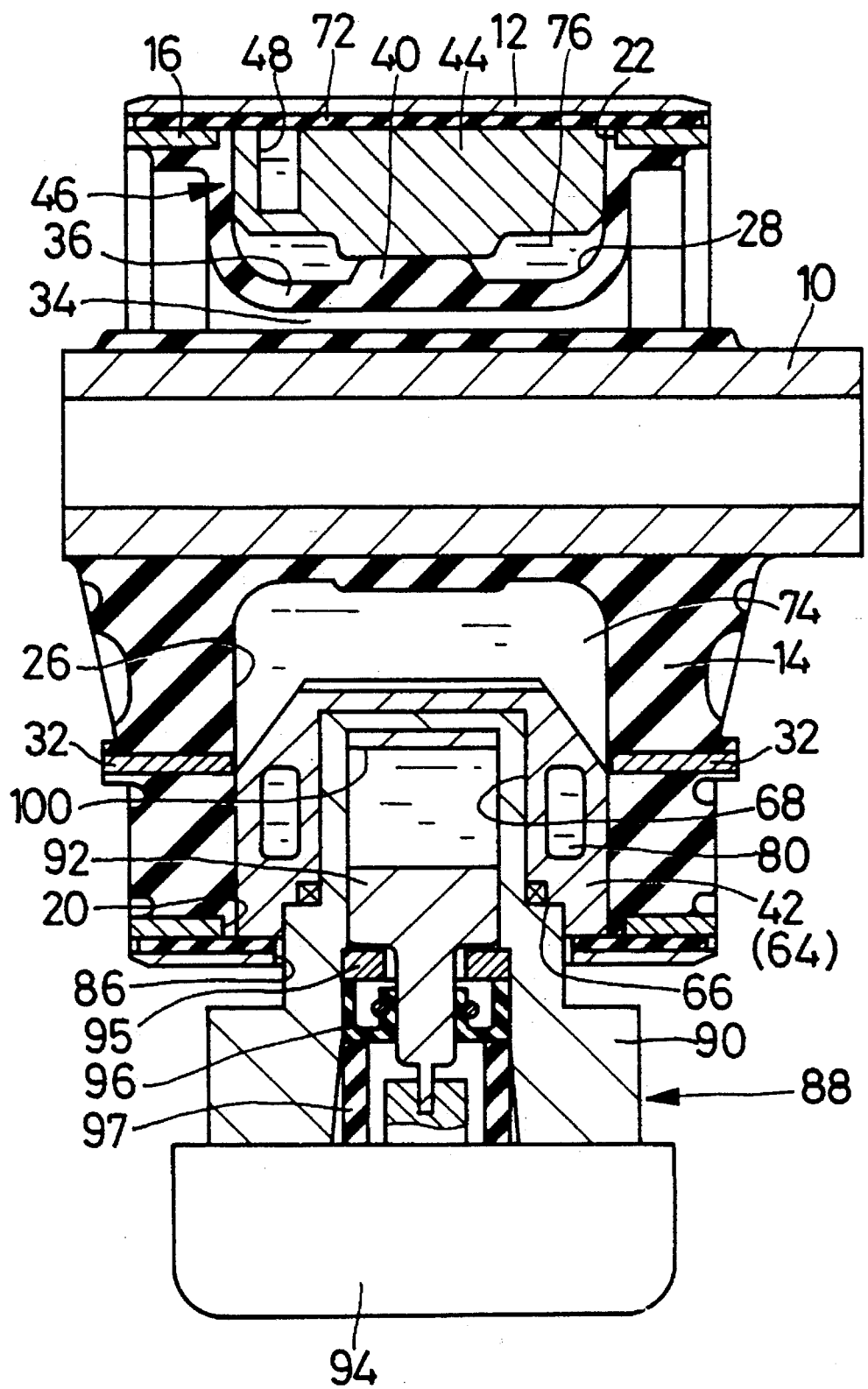
FIG. 2 is a cross sectional view of the engine mount of FIG. 1, taken along line 2—2 of FIG. 1.
Figure 3:
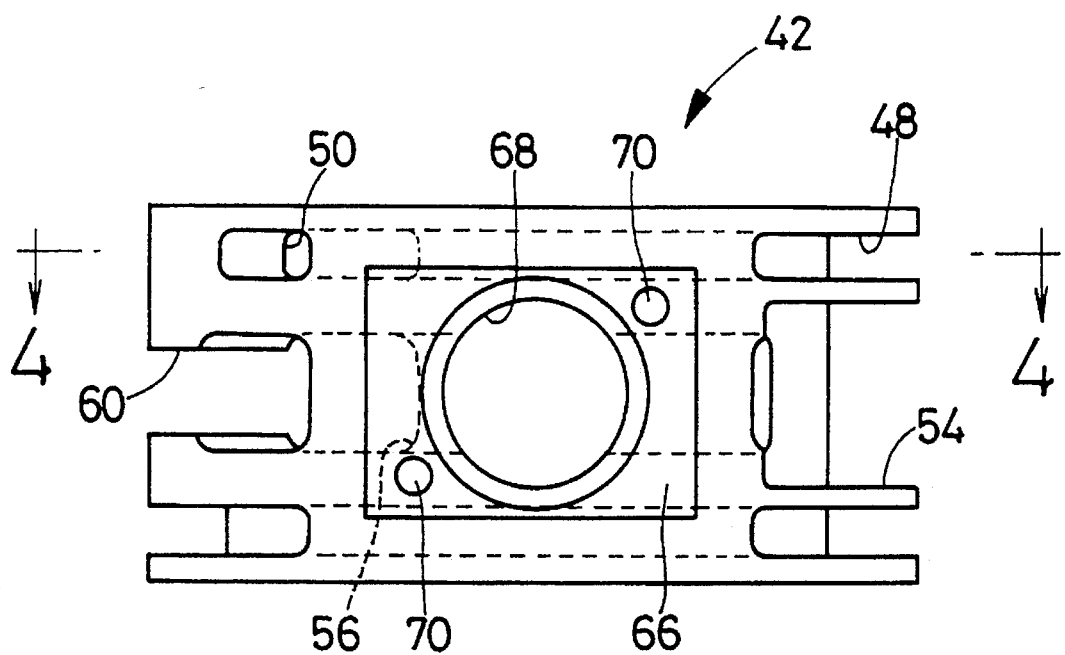
FIG. 3 is a plan view showing a first semicircular orifice member of the engine mount of FIG. 1.
Figure 4:
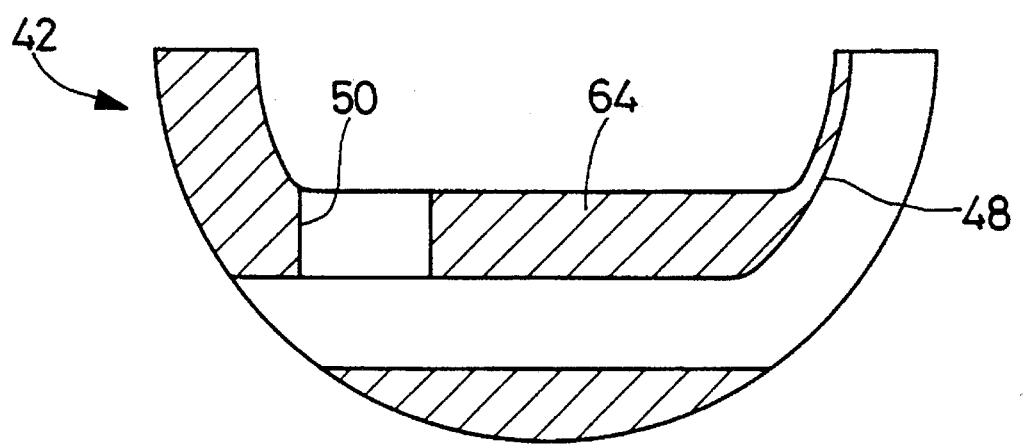
FIG. 4 is a cross sectional view taken along line 4—4 of FIG. 3.
Figure 5:
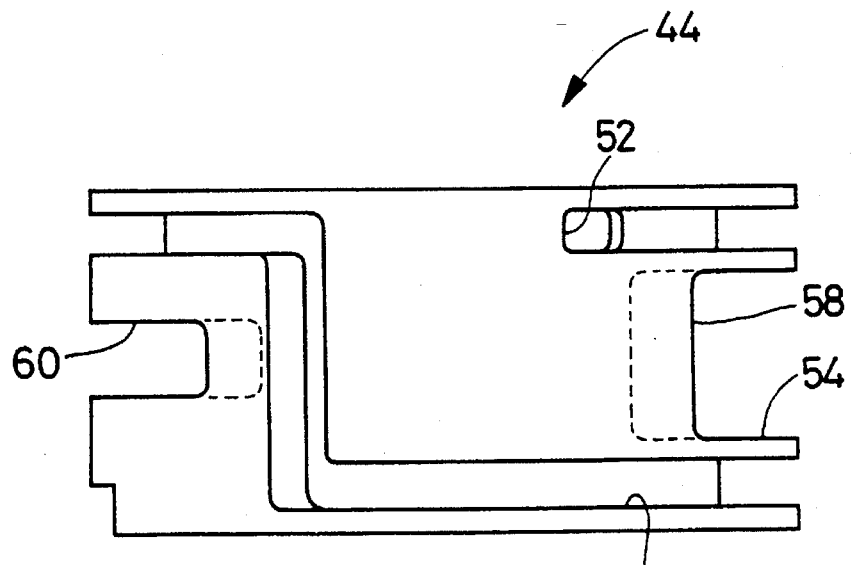
FIG. 5 is a plan view showing a second semicircular orifice member of the engine mount of FIG. 1.
Figure 6:
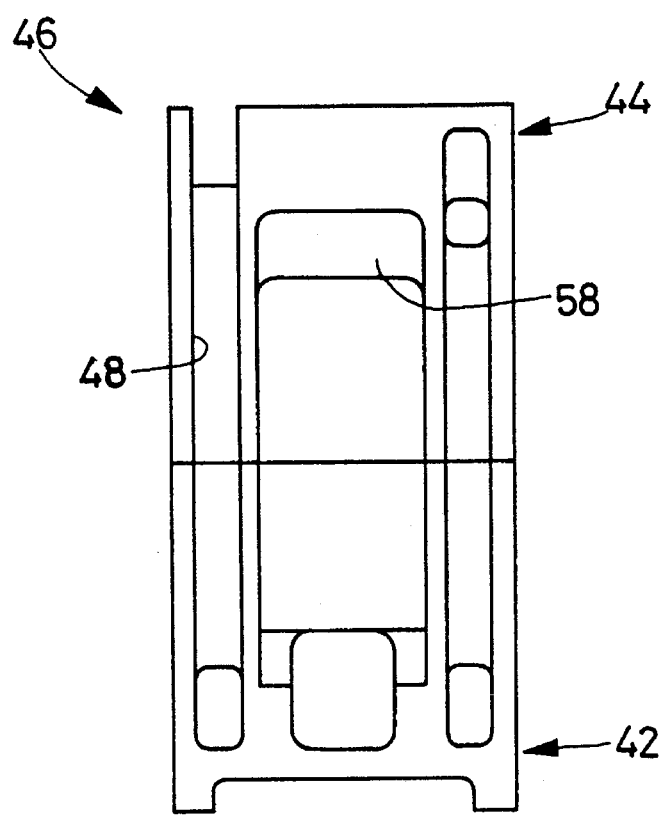
FIG. 6 is a side elevational view showing an orifice structure of the engine mount of FIG. 1, as viewed from the right-hand side of FIG. 1.
Figure 7:
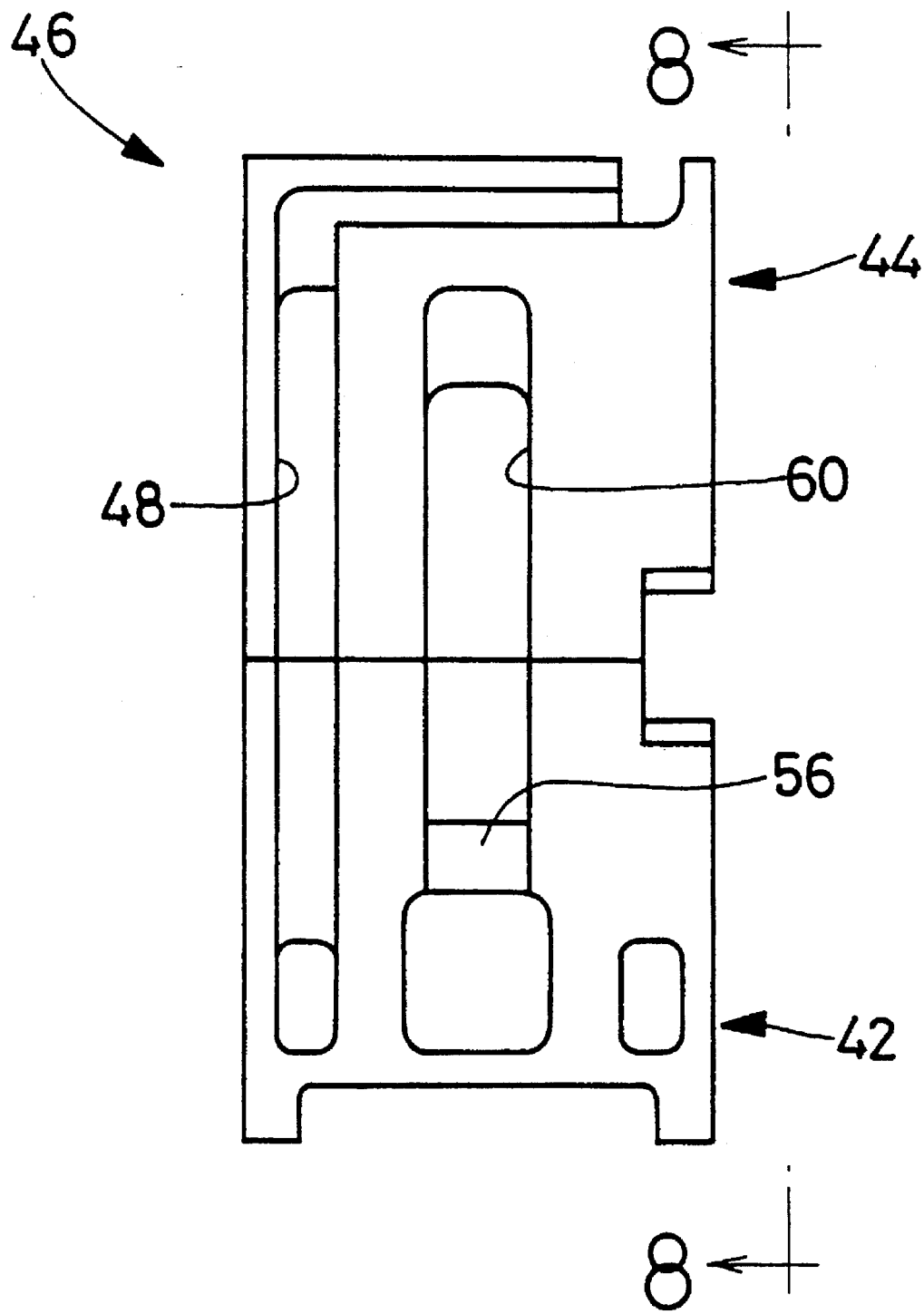
FIG. 7 is a side elevational view showing the orifice structure of the engine mount of FIG. 1, as viewed from the left-hand side of FIG. 1.
Figure 8:
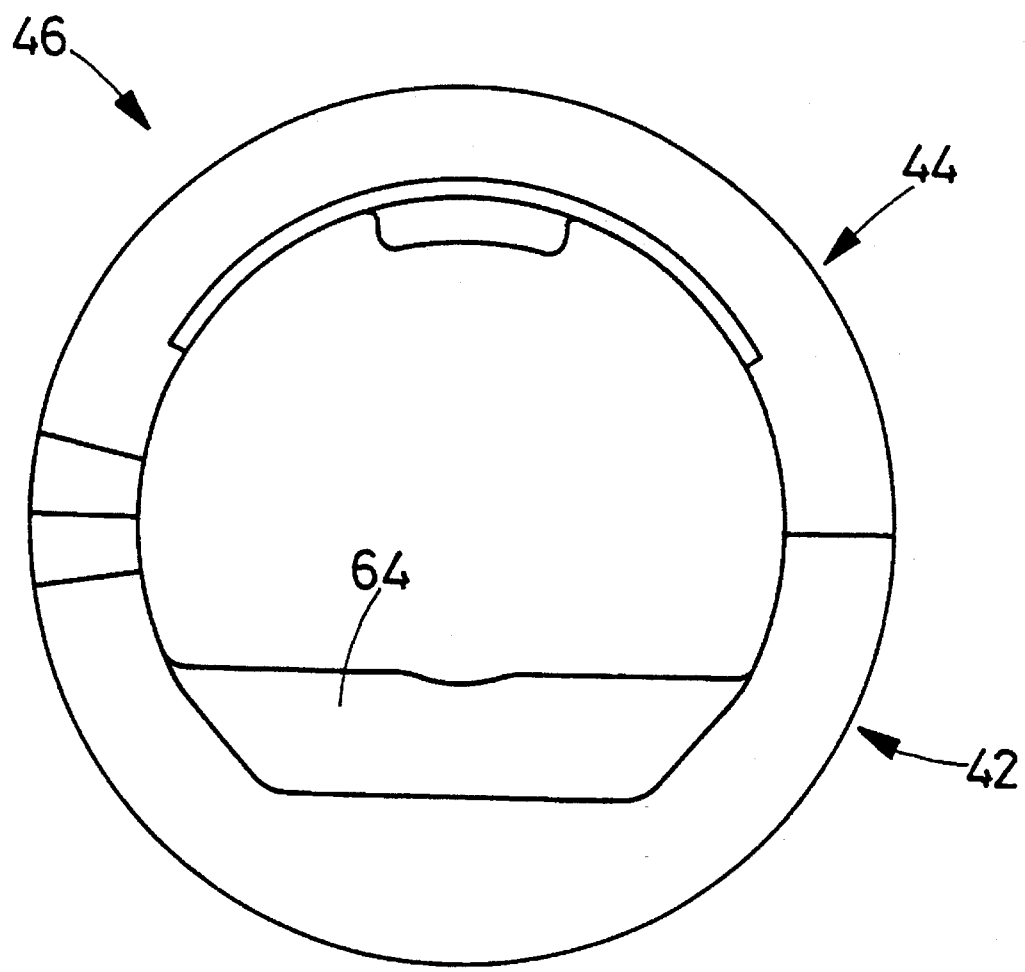
FIG. 8 is a view as seen in the direction of arrows 8, 8 of FIG. 7.

Referring first to FIGS. 1 and 2 showing one embodiment of the present invention in the form of an engine mount for a motor vehicle, reference numerals 10 and 12 respectively denote an inner sleeve and an outer sleeve, both of which are made of metal. These inner and outer sleeves 10, 12 are disposed in eccentric relation with each other, with a suitable radial spacing therebetween, and are connected to each other by an elastic body 14 interposed between the two sleeves 10, 12.

The engine mount as described above is installed on the motor vehicle so as to mount a power unit of the vehicle including its engine upon the vehicle body, in a vibration damping or isolating manner, such that the inner sleeve 10 is fixed to one of the power unit and the vehicle body while the outer sleeve 12 is fixed to the other. With the engine mount thus installed on the vehicle, the weight of the power unit is applied between the inner and outer sleeves 10, 12, whereby the inner and outer sleeves 10, 12 are brought into substantially concentric or coaxial relation with each other, due to elastic deformation of the elastic body 14.

More specifically, the inner sleeve 10 is a cylindrical member having a relatively large thickness, and is attached to the power unit or vehicle body, through a rod (not shown) inserted through an inner bore of the sleeve 10. An intermediate sleeve 16, which is a cylindrical metallic member having a larger diameter than the inner sleeve 10, is disposed radially outwardly of the inner sleeve 10, such that the intermediate sleeve 16 is eccentrically offset with respect to the inner sleeve 10 in the vertical direction of FIG. 1 in which a vibrational load is primarily applied to the engine mount. The intermediate sleeve 16 has an axially intermediate recessed portion having a smaller diameter than its axially opposite end portions. This recessed portion defines an groove 18 which extend in the circumferential direction of the intermediate sleeve 16 so as to receive an orifice-defining structure (which will be described). The intermediate sleeve 16 further has a first window 20, a second window 22 and a third window 24, which are formed through the cylindrical wall of the sleeve 16, with suitable circumferential spacings therebetween. The first, second and third windows 20, 22, 24 have an axial dimension or width which is slightly larger than but substantially equal to the width of the groove 18. The first window 20 extends over a little less than one-half of the whole circumference of the intermediate sleeve 16, and the second and third windows 22, 24 extend over about one-third and one-tenth, respectively, of the whole circumference of the sleeve 16. The intermediate sleeve 16 is disposed radially outwardly of the inner sleeve 10, such that the first window 20 is located on one of the opposite sides of the inner sleeve 10 in the vertical direction of FIG. 1, on which side the radial distance between the inner and intermediate sleeves 10, 16 is larger than that on the other side of the inner sleeve 10.

The elastic body 14 is interposed between the inner sleeve 10 and the intermediate sleeve 16, so as to elastically connect the inner sleeve 10 with the intermediate sleeve 16. This elastic body 14 is a generally cylindrical rubber member having a relative large wall thickness, and is secured at its inner circumferential surface to the inner sleeve 10 and at its outer circumferential surface to the intermediate sleeve 16 by means of vulcanization. Thus, an integral vulcanized assembly consisting of the inner sleeve 10, elastic body 14 and intermediate sleeve 16 is formed.

The elastic body 14 has a first pocket 26 formed on the above-indicated one side of the inner sleeve 10 where the radial distance between the inner and intermediate sleeves 10, 16 is larger, and a second and a third pocket 28, 30 formed on the other side of the inner sleeve 10 where the radial distance between the two sleeves 10, 16 is smaller. The first, second and third pockets 26, 28, 30 are open on the outer circumferential surface of the elastic body 14, and on the outer circumferential surface of the intermediate sleeve 16, through the respective first, second and third windows 20, 22, 24 of the sleeve 16. Intermediate metallic members 32 for adjusting the spring ratio of the mount are secured by vulcanization to axially opposite, side walls of the elastic body 14 which axially define the first pocket 26.

The elastic body 14 has an axial void 34 formed through the entire axial length thereof along bottom walls of the second and third pockets 28, 30. The axial void 34 extends between the inner and intermediate sleeves 10, 16 in the circumferential direction, over substantially half of the circumference of these sleeves. When the engine mount is installed on the vehicle as described above, the axial void 34 serves to reduce or prevent tensile stresses which are induced in the elastic body 14 due to the weight of the power unit, thus assuring improved durability of the elastic body 14. Due to the presence of the axial void 34, the elastic body 14 includes as integral parts thereof a first and a second flexible diaphragm 36, 38, which provide the bottom walls of the second and third pockets 28, 30, respectively. The first and second flexible diaphragms 36, 38 having a relatively small thickness are easily allowed to undergo elastic deformation. A stopper 40 is formed as an integral part of the elastic body 14 on the inner surface of the first flexible diaphragm 36.

The second flexible diaphragm 38 has a smaller circumferential dimension and a slightly greater thickness than the first flexible diaphragm 36. Therefore, the second flexible diaphragm 38 has a larger stiffness than the first flexible diaphragm 36. Further, in the instant embodiment, the area of the second flexible diaphragm 38 is determined to be sufficiently smaller than that of the first flexible diaphragm 36, so that the stiffness of the second flexible diaphragm 38 increases to a great extent as a result of a considerably small amount of deformation thereof. That is, the rate of increase in the stiffness of the first flexible diaphragm 36 with the amount of deformation thereof is smaller than that of the second flexible diaphragm 38.

The intermediate sleeve 16 of the thus constructed integral vulcanized assembly is subjected to a drawing operation, using eight dies, so that the elastic body 14 is preliminarily compressed as needed by reducing the diameter of the intermediate sleeve 16. Then, a first and a second orifice member 42, 44 having a generally semicircular shape are mounted on the integral vulcanized assembly so as to face each other in the diametric direction in which the intermediate sleeve 16 is eccentrically offset with respect to the inner sleeve 10. The first and second orifice members 42, 44 abut on each other at their corresponding circumferential ends to constitute a generally cylindrical orifice-defining structure 46 which is fitted in the grooves 18 of the intermediate sleeve 16.

Referring next to FIGS. 3 through 8, the orifice-defining structure 46 has a first circumferential groove 48 formed in the outer circumferential surfaces of the first and second orifice members 42, 44, to extend in the circumferential direction thereof over substantially one and a half round of the engine mount. The first groove 48 turns several times. With the orifice-defining structure 46 mounted on the integral vulcanized assembly, the first circumferential groove 48 is open at its opposite ends to the first and second pockets 26, 28, respectively, through holes 50, 52 formed through respective bottom walls of the first and second orifice members 42, 44. The orifice-defining structure 46 further has a second circumferential groove 54 formed in the outer circumferential surfaces of the first and second orifice members 42, 44, to extend in the circumferential direction over substantially a half round of the mount, without turning or bending. The second groove 54 has a larger cross sectional area than the first groove 48, and is formed independently of or separately from the first groove 48. With the orifice-defining structure 46 mounted on the above-indicated integral vulcanized assembly, the second groove 54 is open at its opposite ends to the first and second pockets 26, 28, respectively, through holes 56, 58 formed through respective bottom walls of the first and second orifice members 42, 44. Further, the orifice-defining structure 46 has a slot 60 formed through the first and second orifice members 42, 44, to extend from the hole 56 that is open to the first pocket 26, over about one-third of the circumference of the mount, in the circumferential direction opposite to that in which the second groove 54 extends from the hole 56. With the orifice-defining structure 46 mounted on the integral vulcanized assembly, the circumferentially middle portion of this slot 60 is covered at its inner opening with the intermediate sleeve 16, whereby a third circumferential groove 62 is formed between the first and third pockets 26, 30.

The first orifice member 42 of the orifice-defining structure 46 includes a thick-walled tunnel-defining portion 64 formed at its circumferentially intermediate portion located at the opening of the first pocket 26. The first and second circumferential grooves 48, 54 extend like tunnels through the thick-walled portion 64 in the circumferential direction. Namely, the first groove 48 is formed in the circumferential direction through widthwise opposite portions of the thick-walled portion 64, while the second groove 54 is formed in the circumferential direction through a widthwise middle portion of the thick-walled portion 64. The thick-walled tunnel-defining portion 64 has a flat mounting seat 66 formed at a substantially middle portion of the outer circumferential surface thereof. The mounting seat 66 is formed at its middle portion with a valve mounting hole 68 which extends radially inwards and communicates with the second circumferential groove 54 in the form of the tunnel. The mounting seat 66 further has two holes 70 for receiving bolts, which are formed adjacent the valve mounting hole 68.

After the orifice-defining structure 46 is mounted on the integral assembly of the inner and intermediate sleeves 10, 16 and elastic body 14, the outer sleeve 12 is fitted on the outer circumferential surface of the integral assembly with the orifice-defining structure 46, as shown in FIGS. 1 and 2, and is fixed to the outer surface of the intermediate sleeve 16 by reducing the diameter of the outer sleeve 12. This outer sleeve 12 is fixed to the vehicle body or the power unit, through a bracket or the like. A relatively thin sealing rubber layer 72 is formed on the inner circumferential surface of the outer sleeve 12, so as to provide a fluid-tight seal between the intermediate sleeve 16 and the outer sleeve 12. The outer sleeve 12 fitted on the integral assembly as described above fluid-tightly closes the openings of the first, second and third pockets 26, 29, 30 of the elastic body 14, and the openings of the first, second and third circumferential grooves 48, 54, 62 formed in the orifice-defining structure 46.

The first pocket 26 closed by the outer sleeve 12 provides a primary fluid chamber 74 which undergoes pressure changes due to elastic deformation of the elastic body 14 when vibrations are applied between the inner and outer sleeves 10, 12. On the other hand, the second and third pockets 28, 30 closed by the outer sleeve 12 provide a first and a second auxiliary fluid chamber 76, 78, respectively, whose volumes are variable due to elastic deformation of the corresponding first and second flexible diaphragms 36, 38. These primary fluid chamber 74 and first and second auxiliary fluid chambers 76, 78 are filled with a non-compressible fluid, which may be suitably selected from those having a coefficient of viscosity that is not higher than 0.1 Pa.s. For example, the non-compressible fluid is selected from water, alkylene glycol, polyalkylene glycol, silicone oil and others. The filling of the fluid chambers 74, 76, 78 with the non-compressible fluid may be accomplished by assembling the outer sleeve 12 with the integral vulcanized assembly within a mass of the fluid.

With the first and second circumferential grooves 48, 54 closed by the outer sleeve 12, the first groove 48 provides a first orifice passage 80 which communicates with the primary fluid chamber 74 and the first auxiliary fluid chamber 76, while the second groove 54 provides a second orifice passage 82 which also communicates with the primary fluid chamber 74 and the first auxiliary fluid chamber 76. The second orifice passage 82 is formed independently of or separately from the first orifice passage 80. With the third circumferential groove 62 closed by the outer sleeve 12, a third orifice passage 84 which communicates with the primary fluid chamber 74 and the second auxiliary fluid chamber 78 is formed independently of or separately from the first and second orifice passages 80, 82. The length and cross sectional area of the first orifice passage 80 are determined so that the engine mount exhibits a high damping effect with respect to low-frequency vibrations, such as engine shake, having a frequency of around 10 Hz, based on the resonance of the fluid flowing through the first orifice passage 80. The length and cross sectional area of the second orifice passage 82 are determined so that the engine mount provides a sufficiently dynamic low spring constant with respect to medium-frequency vibrations having a frequency of about 15–40 Hz, based on the resonance of the fluid flowing through the second orifice passage 82. Such medium-frequency vibrations may occur during idling of the engine. Further, the length and cross sectional area of the third orifice passage 84 are determined so that the engine mount exhibits a sufficiently low dynamic spring constant with respect to high-frequency vibrations, such as booming noise, having a frequency of about 60–100 Hz, based on the resonance of the fluid flowing through the third orifice passage 84.

The outer sleeve 12 has a window 86 formed through an axially intermediate portion thereof which is radially aligned with the mounting seat 66 of the first orifice member 42. Valve assembly 88 is fixedly bolted onto the mounting seat 66 that is exposed to the outside of the mount through the window 86. The valve assembly 88 includes a valve housing 90 having a generally cylindrical shape with one axial end closed, and a rotary valve 92 received in the valve housing 90. The rotary valve 92 is operated by a drive motor 94 provided at the opening of the housing 90, such that the valve 92 is rotatable about the axis of the housing 90. In the open end portion of the valve housing 90, there are disposed a retainer ring 95 for retaining the rotary valve 92 in position, an annular sealing member 96, and a cylindrical dust seal 97, which are superposed on each other in the axial direction of the housing 90. Thus, a fluid-tight seal between the valve housing 90 and the rotary valve 92 is ensured.

When the rotary valve 92 is placed in a first position as shown in FIGS. 1 and 2, the second orifice passage 82 is closed, that is, the flow of the fluid through the second orifice passage 82 is interrupted by the valve 92, and the fluid communication between the primary fluid chamber 74 and the first auxiliary fluid chamber 76 is disconnected. When the rotary valve 92 is rotated 90° from the above first position to a second position, a valve bore 100 formed through the rotary valve 92 is brought into communication with holes 98, 98 formed through the valve housing 90, and the second orifice passage 82, whereby the fluid is allowed to flow through the second orifice passage 82 between the primary fluid chamber 74 and the first auxiliary fluid chamber 76.

The first and second orifice passages 80, 82 are both formed between the primary fluid chamber 74 and the first auxiliary fluid chamber 76. Therefore, the second orifice passage 82 is tuned to a higher frequency range than the first orifice passage 80 if the ratio $A2/L2$ of the cross sectional area $A2$ of the second orifice passage 82 to the length $L2$ thereof is determined to be larger than the ratio $A1/L1$ of the cross sectional area $A1$ of the first orifice passage 80 to the length $L1$ thereof. On the other hand, the third orifice passage 84 is formed between the primary fluid chamber 74 and the second auxiliary fluid chamber 78, and the bottom wall of the second auxiliary fluid chamber 78, i.e., the second flexible diaphragm 38, has a larger stiffness than that of the first auxiliary fluid chamber 76, i.e., the first flexible diaphragm 36. Therefore, the third orifice passage 84 can be tuned to a higher frequency range than the second orifice passage 82, even if the ratio $A3/L3$ of the cross sectional area $A3$ of the third orifice passage 84 to the length $L3$ thereof is not larger than the ratio $A2/L2$ of the cross sectional area $A2$ of the second orifice passage 82 to the length $L2$ thereof. Namely, the third orifice passage 84 can be tuned to a higher frequency range, either by increasing the stiffness of the second flexible diaphragm 38, or by increasing the ratio $A3/L3$ of the cross sectional area $A3$ to the length $L3$. In this particular embodiment, the ratio $A3/L3$ of the cross sectional area $A3$ of the third orifice passage 84 to the length $L3$ thereof is determined to be slightly smaller than the ratio $A2/L2$ of the cross sectional area $A2$ of the second orifice passage 82 to the length $L2$ thereof.

The ease of flow of the fluid through the first, second and third orifice passages 80, 82, 84 is considered to be determined depending upon a difference in the pressure on the fluid (i.e., the pressure head) between the opposite open ends of each of the orifice passages 80, 82, 84, and a difference in the resistance to flow of the fluid (i.e., head loss) among the orifice passages, as well as the resonance of the fluid in each orifice passage in response to input vibrations in a particular frequency range. The difference in the pressure head is determined by the stiffness of the walls defining the auxiliary fluid chambers 76, 78, and the difference in the head loss or the flow resistance is determined by the cross sectional area, length, and shape or form of bending of each orifice passage, for example. In the instant embodiment, the stiffness of the wall of the second auxiliary fluid chamber 78 is set higher than that of the first auxiliary fluid chamber 76. Further, the stiffness of the wall of the second auxiliary fluid chamber 78 increases at a significantly higher rate, with an increase in the amount of change of the volume of the chamber 78, as compared with the first auxiliary fluid chamber 76. Accordingly, when the engine mount receives low-frequency, large-amplitude vibrations, such as engine shake, to which the first orifice passage 80 is tuned, the fluid is more likely to flow through the first orifice passage 80, rather than the third orifice passage 84 connecting the primary fluid chamber 74 and the second auxiliary fluid chamber 78. With the stiffness of the wall of the second auxiliary fluid chamber 78 being higher than that of the first auxiliary fluid chamber 76, the ratio A3/L3 of the cross sectional area A3 of the third orifice passage 84 to the length L3 thereof is determined to be smaller than the ratio A2/L2 of the cross sectional area A2 of the second orifice passage 82 to the length L2 thereof. Accordingly, when the engine mount receives medium-frequency vibrations, such as those occurring during idling of the engine, to which the second orifice passage 82 is tuned, the fluid is more likely to flow through the second orifice passage 82, rather than the third orifice passage 84.

In the engine mount constructed as described above, the vibration damping/isolating characteristics can be changed by selectively permitting or interrupting flow of the fluid through the second orifice passage 82, by means of the rotary valve 92 as described above. Thus, the first, second and third orifice passages 80, 82, 84 selectively perform their vibration damping or isolating functions as described later, depending upon input vibrations applied to the mount.

More specifically, when the second orifice passage 82 is closed or disconnected by the rotary valve 92, so as to permit flow of the fluid only through the first and third orifice passages 80, 84, as shown in FIGS. 1 and 2, the fluid is more likely to flow through the first orifice passage 80, rather than the third orifice passage 84, upon application of low-frequency vibrations, such as engine shake, to the engine mount, due to the difference in the stiffness of the walls defining the first and second auxiliary fluid chambers 76, 78, for example. Consequently, the engine mount exhibits an excellent damping effect with respect to the low-frequency vibrations, on the basis of the resonance of the fluid flowing through the first orifice passage 80. When the engine mount receives high-frequency, small-amplitude vibrations, such as low-speed booming noise, the flow resistance of the first orifice passage 80 becomes excessively high, and the fluid does not substantially flow through the first orifice passage 80 as if it were closed. In addition, the stiffness of the wall of the second auxiliary fluid chamber 78 does not increase so much upon a small amount of change of the volume of the chamber 78. For at least these reasons, the fluid is caused to effectively flow through the third orifice passage 84 upon application of the high-frequency vibrations, and the engine mount exhibits a sufficiently low dynamic spring constant due to the resonance of the fluid flowing through the third orifice passage 84.

When the rotary valve 92 is placed in its open position to permit flow of the fluid through the second orifice passage 82, the fluid in the mount is allowed to flow any one of the first, second and third orifice passages 80, 82, 84. In this state, when the engine mount receives medium-frequency vibrations, with the engine idling, for example, the flow resistance of the first orifice passage 80 becomes excessively large, and the fluid hardly flow through the orifice passage 80 as if it were closed. At the same time, the fluid is more likely to flow through the second orifice passage 82 than the third orifice passage 84, due to the difference in the flow resistance between the second orifice passage 82 and the third orifice passage 84, and the difference in the stiffness of the walls defining the first and second auxiliary fluid chambers 76, 78. Consequently, the fluid is caused to effectively flow through the second orifice passage 82, whereby the engine mount exhibits a sufficiently low dynamic sprint constant, due to the resonance of the fluid flowing through the passage 82. When the engine mount receives high-frequency, small-amplitude vibrations, with the rotary valve 92 placed in the open position, the flow resistance of the second orifice passage 82 as well as the first orifice passage 80 becomes excessively large, and the fluid hardly flows through the second orifice passage 82 as if it were closed. Since the stiffness of the wall defining the second auxiliary fluid chamber 78 does not increase so much upon a small amount of change of the volume of the fluid chamber 78, the fluid is caused to effectively flow through the third orifice passage 84, and the engine mount exhibits a sufficiently low dynamic spring constant due to the resonance of the fluid flowing through the third orifice passage 84.

The rotary valve 92 is opened while the engine is being in its idling condition, and is closed when the vehicle is running, so that the engine mount provides excellent damping and isolating effects with respect to the vibrations occurring during the engine idling, and the vibrations, such as engine shake and low-speed booming noise, which may occur during running of the vehicle, due to the resonance of the fluid flowing through a selected one of the orifice passages 80, 82, 84. In addition, the instant engine mount exhibits excellent isolating effect with respect to high-frequency vibrations while the engine is idling, due to the resonance of the fluid flowing through the third orifice passage 84.

The vibration damping/isolating characteristics of the engine mount of the present embodiment can be changed merely by rotating the rotary valve 90 to permit or inhibit flow of the fluid through the second orifice passage 82. This advantageously eliminates a need to provide two valve means for opening and closing two orifice passages, or provide a valve having a plurality of valve faces to one of which is exposed the third orifice passage 84. This eventually leads to a reduced number of components and a simplified structure of the engine mount, and significantly improved efficiency in manufacturing the mount. Further, an increased choice is given for designing the orifice passages 80, 82, 84, and therefore each of the orifice passages can be easily tuned to a desired frequency range to achieve a desired vibration damping/isolating characteristic.

In the engine mount of the present embodiment, the first and second flexible diaphragms 36, 38 which provide the bottom walls of the first and second auxiliary fluid chambers 76, 78 are formed as integral parts of the elastic body 14. This further reduces the number of components of the mount and simplifies the mount structure, assuring further improved efficiency in manufacturing the mount. In addition, since the first and second flexible diaphragms 36, 38 are not exposed to the outer circumferential surface of the engine mount, these diaphragms 36, 38 are prevented from being damaged, for example, and exhibit improved durability and reliability.

In the engine mount of the instant embodiment, the stiffness of the wall of the second auxiliary fluid chamber 78 is made larger than that of the first auxiliary fluid chamber 76, and the ratio A/L of the cross sectional area of the second orifice passage 82 to the length thereof is higher than that of the third orifice passage 84. Therefore, upon application of medium-frequency vibrations to the instant mount, the fluid is far more likely to flow through the second orifice passage 82, rather than the third orifice passage 84. Consequently, the engine mount exhibits a further improved isolating effect with respect to the vibrations occurring during idling of the engine, due to the resonance of the fluid flowing through the second orifice passage 82.

While the present invention has been described in its presently preferred embodiment, for illustrative purpose only, it is to be understood that the invention is not limited to the details of the illustrated embodiment, but may be otherwise embodied.

For instance, the cross sectional areas, lengths and configurations of the first, second and third orifice passages 80, 82, 84 are not limited to those of the illustrated embodiment, but may be changed as needed depending upon the required damping or isolating characteristics of the elastic mount.

The structure for defining the first, second and third orifice passages 80, 82, 84 is also not limited to that of the illustrated embodiment. For example, an orifice passage or passages may be formed within the elastic body 14 or between the intermediate sleeve 16 and the outer sleeve 12.

The third orifice passage 84 may be designed such that the ratio of the cross sectional area of the third orifice passage 84 to the length thereof is higher than that of the second orifice passage 82, in view of the difference in the stiffness between the first and second flexible diaphragms 36, 38, provided the fluid is less likely to flow through the third orifice passage 84 as compared with the first and second orifice passages 80, 82, when the engine mount receives the vibrations in frequency ranges to which the first and second orifice passages 80, 82 are tuned.

Further, the structure for defining the first and second auxiliary fluid chambers 76, 78 is not limited to that of the illustrated embodiment, but may be changed. For example, the two auxiliary fluid chambers may be formed in parallel with each other, such that the fluid chambers are spaced a suitable distance from each other in the axial direction of the mount. Otherwise, the side wall portions of the auxiliary fluid chambers 76, 78 which are opposed to each other in the axial direction of the mount may be formed by the flexible diaphragms, or the radially outer walls of the auxiliary fluid chambers 76, 78 may be formed by the flexible diaphragms, by closing the openings of appropriate pockets with these diaphragms.

The first and second flexible diaphragms 36, 38 may be formed as separate members from the elastic body 14. Further, the stiffness and maximum amount of deformation of the second flexible diaphragm 38 may be adjusted as desired by fixing a canvas or the like to the diaphragm 38.

The valve means for selectively opening and closing the second orifice passage 82 is not limited to the rotary valve as used in the illustrated embodiment, but may be a sliding-type gate valve or a butterfly valve, for example. The valve means may also have a drive shaft which protrudes outwards in the axial direction of the mount, in view of the structure or manner in which the elastic mount is mounted on two members to be flexibly connected.

While the engine mount of the motor vehicle has been illustrated above as one embodiment of the present invention, the principle of the present invention is also equally applicable to a differential gear mount or suspension bushing of a motor vehicle, or to various cylindrical elastic mounts used in various applications other than motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount for flexibly connecting two members to each other, comprising:

an inner sleeve fixed to one of the two members to be flexible connected;

an outer sleeve disposed radially outwardly of said inner sleeve with a radial spacing therebetween, and fixed to the other of the two members;

an elastic body interposed between said inner and outer sleeves, said elastic body partially defining a primary fluid chamber formed between the inner and outer sleeves, said primary fluid chamber being adapted to undergo pressure changes upon application of a vibrational load to the mount;

a first flexible diaphragm partially defining a first auxiliary fluid chamber formed between said inner and outer sleeves, a volume of said first auxiliary fluid chamber being variable due to deformation of said first flexible diaphragm;

a second flexible diaphragm partially defining a second auxiliary fluid chamber formed between said inner and outer sleeves, a volume of said second auxiliary fluid chamber being variable due to deformation of said second flexible diaphragm, said second flexible diaphragm having a larger stiffness than said first flexible diaphragm;

a non-compressible fluid filling said primary fluid chamber, said first auxiliary fluid chamber and said second auxiliary fluid chamber;

an orifice-defining structure for separately defining a first orifice passage, a second orifice passage, and a third orifice passage, said first orifice passage communicating with said primary fluid chamber and said first auxiliary fluid chamber so as to allow said non-compressible fluid to flow therebetween, said first orifice passage being tuned to a first frequency range, said second orifice passage communicating with said primary fluid chamber and said first auxiliary fluid chamber so as to allow said non-compressible fluid to flow therebetween, said second orifice passage being tuned to a second frequency range that is higher than said first frequency range, said third orifice passage communicating with said primary fluid chamber and said second auxiliary fluid chamber so as to allow said non-compressible fluid to flow therebetween, said third orifice passage being tuned to a third frequency range that is higher than said second frequency range, and being designed such that said non-compressible fluid is less likely to flow through said third orifice passage than through said first and second orifice passages, when the mount receives vibrations in said first and second frequency ranges; and valve means for selectively permitting or interrupting flow of the fluid through said second orifice passage between said primary fluid chamber and said second auxiliary fluid chamber.

2. A fluid-filled cylindrical elastic mount according to claim 1, further comprising an intermediate sleeve disposed radially outwardly of said inner sleeve with a radial spacing therebetween, and having a first window, a second window, and a third window, said elastic body being interposed between and bonded by vulcanization to said inner sleeve and said intermediate sleeve, and having a first pocket, a second pocket and a third pocket, which are open on an outer circumferential surface of said intermediate sleeve through said first window, said second window and said third window, respectively, said primary fluid chamber, said first auxiliary fluid chamber and said second auxiliary fluid chamber being formed by closing respective openings of said first, second and third pockets with said outer sleeve, said first flexible diaphragm providing a bottom wall of said second pocket, said second flexible diaphragm providing a bottom wall of said third pocket.

3. A fluid-filled cylindrical elastic mount according to claim 1, wherein said first and second flexible diaphragms are formed as integral parts of said elastic body.

4. A fluid-filled cylindrical elastic mount according to claim 1, wherein said first auxiliary fluid chamber and said second auxiliary fluid chamber are located diametrically opposite to said primary fluid chamber with respect to said inner sleeve, in a direction in which said vibrational load is mainly applied to the mount, said first and second auxiliary fluid chambers being spaced from each other in a circumferential direction of the mount.

5. A fluid-filled cylindrical elastic mount according to claim 1, wherein said orifice-defining structure has an annular or cylindrical shape, and is disposed along an inner circumferential surface of said outer sleeve, such that the first orifice passage extends in a circumferential direction of the mount over a length of at least one round of the mount, and the second orifice passage extends from said primary fluid chamber in one of opposite circumferential directions, over a length of less than one round of the mount, while the third orifice passage extends from said primary fluid chamber in the other of said opposite circumferential directions, over a length of less than one round of the mount.

6. A fluid-filled cylindrical elastic mount according to claim 5, wherein said orifice-defining structure has a tunnel formed therethrough so as to provide a circumferential portion of said second orifice passage, said orifice-defining structure further having a valve mounting hole which communicates with said tunnel and is open on an outer circumferential surface thereof, said valve means comprising a rotary valve which is received in said valve mounting hole.

7. A fluid-filled cylindrical elastic mount according to claim 1, wherein a ratio of a cross sectional area of said third orifice passage to a length thereof is smaller than a ratio of a cross sectional area of said second orifice passage to a length thereof.

* * * * *